Patented May 10, 1932

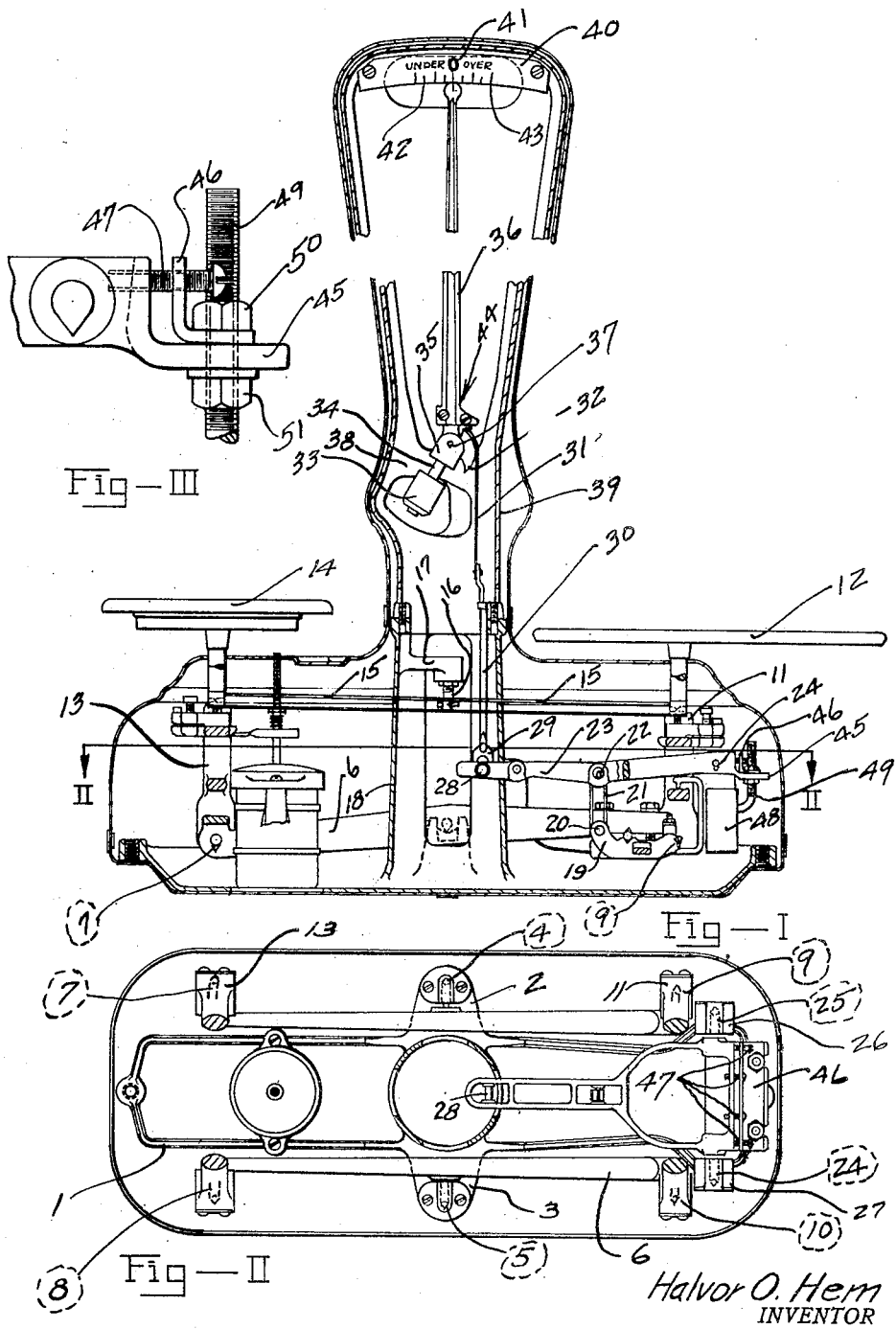

1,857,278

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed June 30, 1930. Serial No. 464,895.

This invention relates to improvements in weighing scales and more particularly to scales of the so-called predetermined weight type, viz., scales which are adapted to weigh articles intended to be of predetermined weight and to indicate small excesses and deficiencies, and one of the principal objects of the invention is the provision of simple means to cause the scale to weigh correctly when it is in an out-of-level position.

Another object of the invention is the provision of a gravity controlled predetermined weight scale of the so-called "lighthouse" type, with the provision of means which will automatically neutralize any tendency of the scale to indicate incorrectly because of an out-of-level condition.

These and other objects will be apparent from the following description, in which reference is had to the accompanying drawings illustrating a preferred embodiment of my invention and wherein similar reference numerals designate similar parts throughout the several views.

In the drawings:—

Figure I is a front elevational view, parts being broken away and parts in section, of a scale of the type referred to.

Figure II is a sectional plan view of the base mechanism taken substantially along the line II—II of Figure I.

Figure III is an enlarged fragmentary side elevation of an adjusting means hereinafter referred to.

Referring to the drawings in detail, the scale is preferably built upon a cast iron base frame 1 which has integral upwardly extending fulcrum stands 2 and 3. The fulcrum stands are provided with bearings (not shown) in which the fulcrum pivots 4 and 5 of a main scale lever 6 are supported. On each side of the fulcrum pivots 4 and 5 and equidistant therefrom are load pivots 7, 8, 9 and 10. A spider 11, supporting a load platter or receiver 12, rests upon the load pivots 9 and 10. The load pivots 7 and 8 similarly support a spider 13 to which is fastened a platter 14 to receive load-offsetting weights. To maintain the condition of level of the two platters 12 and 14, the ends of a check link 15, of well known type, are connected to the spiders 11 and 13, and the center of the check link, which is provided with suitable bearings, is connected to a check link pivot stud 16 adjustably positioned in an inwardly extending boss 17 forming an integral part of an upwardly extending frame 18 which is a part of the base frame 1. Intermediate the fulcrum pivots and the load pivots, and fixed in an adjustable portion 19 of the lever 6, is a pivot 20 which is engaged by the lower end of a link 21 whose upper end pivotally engages a pivot 22 located in an auxiliary lever 23.

This lever 23 is provided with fulcrum pivots 24 and 25, adjacent one of its ends, which rest in suitable bearings in the ends of upwardly extending standards 26 and 27. These standards are secured to the base frame 1. The other end of the lever 23 is provided with a nose pivot 28 engaging a stirrup 29 which in turn engages a connection 30 consisting in part of a flexible ribbon 31 which overlies and is secured to a segment 32. This segment forms the power arm of a scale pendulum 44 which, in addition to the segment 32, comprises a pendulum weight 33 mounted on a stem 34, a body 35 and an indicator 36. A fulcrum pivot 37 is fixed in the pendulum body and extends laterally therefrom and is supported in suitable bearings (not shown) in brackets 38 formed in the upwardly extending skeleton indicator housing 39 which is mounted on the frame 18. In the upper end of the skeleton housing 39 a chart 40 is fixed. This chart is provided with a zero character 41 in the center and may be provided with a number of indicia 42 and 43. The indicia 43 represent the amount of commodity over the predetermined required amount, while the indicia 42 similarly represent the amount under the required predetermined amount.

When a pendulum scale is placed upon a counter or other support which is slightly out of level, the relative position of the center of gravity of the pendulum with reference to a vertical line drawn through its fulcrum pivot is changed, resulting in an increase or decrease in the counterbalancing effect of the pendulum. In scales of this general type which were known prior to my invention, such increase or decrease in pendulum counterbalancing effect would prevent the indicator from correctly indicating the variation or non-variation of a load from a predetermined standard. It has heretofore been necessary, therefore, to relevel such scales whenever they were moved or their previous condition of level was changed. By the present invention I have made it unnecessary to so relevel the scale and have provided means to neutralize increases or decreases in the counterbalancing effect of the pendulum which result in changes in the condition of level of the scale.

To this end I have provided the auxiliary lever 23 to the right of its fulcrum pivots 24 and 25 with a projection or horizontally extending ledge 45 which supports an angular member 46 that is adjustable longitudinally of the lever 23. This member 46 is adjusted by means of four screws 47, two of which are threaded into apertures of the angular member 46 and thrust against the back of the lever 23, while the other two extend through apertures in the member 46 and are threaded into the lever. The result of this construction is that by loosening and tightening the proper screws 47, the angular member may be adjusted horizontally. Fixed to a weight 48 and extending vertically through apertures in the angular member 46 and vertically adjustable therein are elbow pieces 49, the ledge 45 being notched to permit passage of the elbow pieces and to permit their horizontal adjustment with the angular member 46. Nuts 50 and 51 serve to lock the adjustable members firmly in adjusted position. Adjustment of the member 46 and the elbow pieces 49 shifts the center of mass of the weight 48 horizontally and vertically.

It will be seen that the angular movement of the pendulum is greater than the angular movement of the weight 48. The weight or mass of the latter, therefore, is heavier than that of the pendulum, so that the changes in moment of each weight resulting from changes of condition of level are substantially the same. The effect on the pendulum 44 and the effect on the weight 48 of tilting the scale are opposite and the influence of the weight may, by proper adjustment of the angular member 46 and elbow pieces 49, be made to completely neutralize the tendency of the pendulum and index to change position when the scale is tilted. The indicator will, therefore, remain in registration with the zero character 41 when the scale is out of level and the pans are empty or are equally loaded.

The embodiment of my invention herein shown and described is to be regarded as illustrative only, and it is to be understood that the invention is susceptible to variation, modification and change within the spirit and scope of the subjoined claims.

Having described my invention, I claim:

1. In a counter scale, in combination, a pendulum load-counterbalancing mechanism, indicating mechanism connected thereto, and base lever mechanism operatively engaging said counterbalancing and indicating mechanisms, said lever mechanism having a pendulous mass attached to one of its component members.

2. In a counter scale, in combination, a pendulum load-counterbalancing mechanism, indicating mechanism connected thereto, and base lever mechanism operatively engaging said counterbalancing and indicating mechanisms, said lever mechanism having a pendulous mass adjustably attached to one of its component members.

3. In a counter scale, in combination, a pendulum load-counterbalancing mechanism, indicating mechanism attached thereto, base lever mechanism operatively engaging said counterbalancing and indicating mechanisms, said lever mechanism including a plurality of load-receivers and a pendulous mass attached to one of the component members.

4. In a counter scale, in combination, a pendulum load-counterbalancing mechanism, indicating mechanism attached thereto, lever mechanism operatively engaging said counterbalancing and indicating mechanisms, said lever mechanism including a plurality of load-receivers and a pendulous mass attached to one of the component members, said pendulous mass being adapted to act in opposition to said pendulum load-counterbalancing mechanism when the scale is moved into an unlevel position.

5. In a counter scale, in combination, a pendulum load-counterbalancing mechanism, indicating mechanism attached thereto, base lever mechanism operatively engaging said counterbalancing and indicating mechanisms, said base lever mechanism including a plurality of load-receivers and a pendulous mass adjustably attached to one of the component members of said base lever mechanism, said pendulous mass being adapted to act in opposition to said pendulum load-counterbalancing mechanism when the scale is moved into an unlevel position.

6. In a counter scale, in combination, a base housing containing load-supporting lever mechanism, and a vertically extending housing mounted upon said base housing, said vertically extending housing containing a load-counterbalancing pendulum and an indicator, said lever mechanism within said base housing having a pendulous mass attached to a component member, said pendulum and said pendulous mass tending equally to move said indicator in opposite directions when said scale is moved into an unlevel position.

7. In a counter scale, in combination, a base housing containing load-supporting lever mechanism, and a vertically extending housing mounted upon said base housing, said vertically extending housing containing a load-counterbalancing pendulum and an indicator, said lever mechanism within said base housing having a pendulous mass adjustably attached to a component member, said pendulum and said pendulous mass tending equally to move said indicator in opposite directions when said scale is moved into an unlevel position.

8. In an even balance scale adapted to indicate the amount of commodity over or under a predetermined amount, in combination, automatic load-offsetting means including a pendulum, an indicator operated thereby, a lever system comprising a main lever of the first order having a fulcrum pivot and pivots disposed on each side thereof, said last named pivots supporting load and counterweight receivers, connections between said main lever and said pendulum including an auxiliary lever, and a pendulous mass secured to said auxiliary lever, said pendulum and said pendulous mass tending equally to move said indicator in opposite directions when said even balance scale is placed in an unlevel position.

9. In a weighing scale, in combination, an indicator, a load-counterbalancing pendulum and a pendulated lever, connections between said pendulum and lever, the pendulous mass of the lever being greater than the pendulous mass of the pendulum, and the centers of mass of said pendulum and lever being so disposed as to tend equally to move said indicator in opposite directions when the condition of level of the weighing scale is changed.

10. In a weighing scale, in combination, an indicator, a load-counterbalancing pendulum and a pendulated lever, connections between said pendulum and said lever, the pendulous mass of said lever being greater than the pendulous mass of said pendulum, the movement of the center of gravity of said pendulum from a vertical line due to an unlevel condition of the weighing scale being greater than the movement from a similar vertical line of the center of mass of such pendulous mass on said lever, due to the same unlevel condition, so that the changes in moments of said pendulous masses resulting from changes in level are substantially equal.

11. In a weighing scale, in combination, a weighing lever, load-receiving and load-counterbalancing means, an operative connection between said weighing lever and said load-counterbalancing means, said operative connection comprising a lever having nose and fulcrum pivots and having its center of mass substantially on a vertical line passing through its fulcrum pivot and substantially at right angles to a line passing through said nose and fulcrum pivots.

12. In a weighing scale, in combination, a load-supporting lever mechanism, a load-counterbalancing pendulum, means connecting said load-supporting lever mechanism and said load-counterbalancing pendulum, said means including a lever having a rearward extension, an aperture in said extension and a member having a weight secured to its lower end extending through said aperture, and means for adjusting said weight along the longitudinal axis of said lever.

13. In a weighing scale, in combination, a load-supporting lever mechanism, load-counterbalancing pendulum, means connecting said load-supporting lever mechanism and said load-counterbalancing pendulum, said means including a lever having a rearward extension, an angular member supported upon said extension, apertures in said angular member and said extension, a member having a weight secured to its lower end and extending through said apertures, means for adjusting said weight with reference to the longitudinal axis of said lever, and means for adjusting said weight in a plane at right angles to the plane of said first adjustment.

14. In a weighing scale, in combination, a load-supporting lever mechanism, load-counterbalancing pendulum, means connecting said load-supporting lever mechanism and said load-counterbalancing pendulum, said means including a lever having a rearward extension, an angular member supported upon said extension, apertures in said angular member and said extension, a member having a weight secured to its lower end extending through said apertures, means for adjusting said weight with reference to the longitudinal axis of said lever, and means for adjusting said weight in a plane at right angles to the plane of said first adjustment, said adjusting means being adapted to lock said adjustment.

HALVOR O. HEM.